(12) United States Patent
Blair

(10) Patent No.: US 6,211,579 B1
(45) Date of Patent: Apr. 3, 2001

(54) MULTIPLE OUTPUT CONVERTER HAVING A LOW POWER DISSIPATION CROSS REGULATION COMPENSATION CIRCUIT

(75) Inventor: Barry O. Blair, Garland, TX (US)

(73) Assignee: Lucent Technologies, Inc., Murray Hill, NJ (US)

( * ) Notice: Subject to any disclaimer, the term of this patent is extended or adjusted under 35 U.S.C. 154(b) by 0 days.

(21) Appl. No.: 09/408,728

(22) Filed: Sep. 29, 1999

(51) Int. Cl.[7] .................................................. H02J 1/00
(52) U.S. Cl. ................... 307/24; 307/18; 307/28; 307/75
(58) Field of Search ............................... 323/293, 298; 363/95, 97; 307/24, 18, 28, 75, 82

(56) References Cited

U.S. PATENT DOCUMENTS

| 4,270,165 | * | 5/1981  | Carpenter et al. | 307/82  |
| 4,860,188 | * | 8/1989  | Bailey et al.    | 307/82  |
| 4,877,972 | * | 10/1989 | Sobhani et al.   | 307/82  |
| 5,303,138 |   | 4/1994  | Rozman           | 263/21  |
| 5,448,155 | * | 9/1995  | Jutras           | 323/285 |
| 5,479,087 | * | 12/1995 | Wright           | 323/267 |
| 5,541,828 |   | 7/1996  | Rozman           | 363/21  |

* cited by examiner

Primary Examiner—Fritz Fleming
(74) Attorney, Agent, or Firm—Locke Liddell & Sapp LLP

(57) ABSTRACT

A compensation circuit for a DC—DC converter having a low voltage output line and a plurality of high voltage output lines applied to a plurality of loads includes an adjustable impedance source connected to the low voltage output line. The impedance source generates a feedback control signal to the DC—DC converter used to control the transformer duty cycle. A sensing circuit is connected to the plurality of high voltage output lines for generating a control signal which represents variations in the output voltages of the high voltage output lines. The control signal is applied to the impedance source to thereby regulate the feedback control signal which in turn provides regulation for the high voltage output lines.

19 Claims, 2 Drawing Sheets

MULTIPLE OUTPUT CONVERTER HAVING A LOW POWER DISSIPATION CROSS REGULATION COMPENSATION CIRCUIT

TECHNICAL FIELD OF THE INVENTION

The present invention relates to DC—DC power converters, and more particularly to a multiple output converter with a low power dissipation cross regulation compensation circuit for regulation of the multiple outputs using a minimal number of components.

BACKGROUND OF THE INVENTION

DC—DC converters are normally used as constant DC voltage power supplies. The desirability of having a DC—DC converter that provides a number of different voltage outputs to a number of different independent loads has been recognized. There is a continuing need for such a circuit that is relatively simple in construction and relatively inexpensive, and which provides stable voltage levels to a number of independent loads that, if desired, can be electrically isolated. With electrical isolation, noise, impedance changes, and the like from one load does not affect the power transmitted to another load.

Multiple output DC—DC converters for providing a regulated voltage have typically required separate outputs, provided by separate transformer windings as well as independent direct voltage regulating controls for each output where precise regulation is required. Schottky diodes are typically used on low voltage outputs of DC—DC converters because of the low forward voltage drop. The forward voltage drop of a Schottky diode varies significantly with current and operating temperatures. Variation of the Schottky forward voltage drop is amplified by the converter transformer turns ratio and such variation produces voltage variation on the other unregulated outputs. The low voltage outputs require tight regulation due to the logic circuitry which the low voltage outputs support, and are therefore used to control the transformer duty cycle of the converter. It is therefore desirable to independently regulate the output of the other, unregulated outputs of the converter.

Previously approaches for output regulation have been to use a linear regulator which uses a pass element to regulate an unregulated output. However, this approach requires a high power dissipation in the pass element, which requires short circuit protection for the pass element.

A need has thus arisen for a circuit for regulating outputs of a multiple output DC—DC converter which is simple in operation and minimizes the number of circuit components.

SUMMARY OF THE INVENTION

In accordance with the present invention, a compensation circuit for a DC—DC converter having a low voltage output line and a plurality of high voltage output lines applied to a plurality of loads is provided. The compensation circuit includes an adjustable impedance source connected to the low voltage output line. The impedance source generates a feedback control signal to the DC—DC converter used to control the transformer duty cycle. A sensing circuit is connected to the plurality of high voltage output lines for generating a control signal which represents variations in the output voltages of the high voltage output lines. The control signal is applied to the impedance source to thereby regulate the feedback control signal which in turn provides regulation for the high voltage output lines.

BRIEF DESCRIPTION OF THE DRAWINGS

For a more complete understanding of the present invention and for further advantages thereof, reference is now made to the following Description of the Preferred Embodiments taken in conjunction with the accompanying Drawings in which.

DESCRIPTION OF THE PREFERRED EMBODIMENTS

Figure 1:
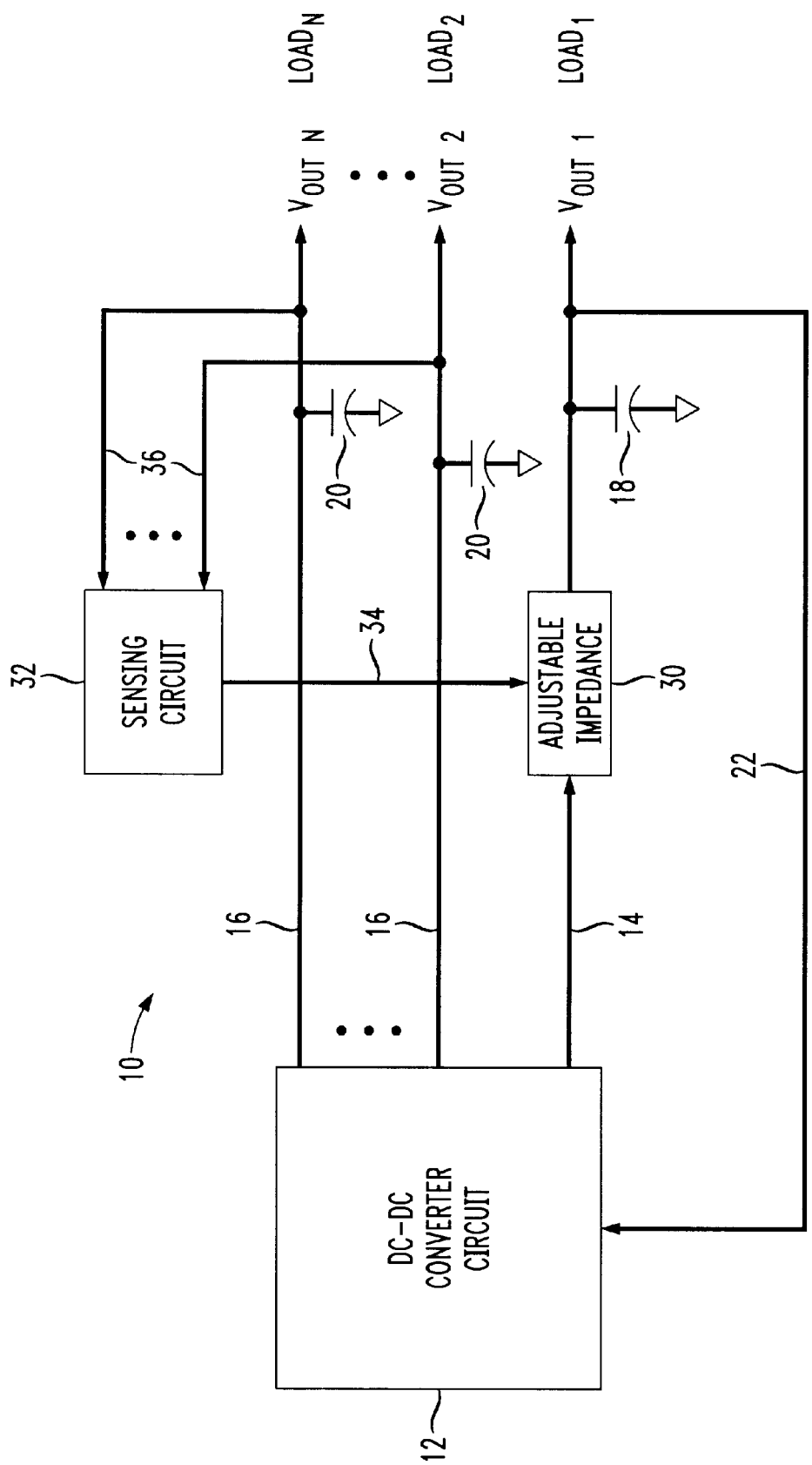
FIG. 1 is a block diagram of the present compensation circuit.

Referring to FIG. 1, a block diagram of the present compensation circuit, generally identified by the numeral 10 for a DC—DC converter circuit 12 is illustrated. DC—DC converter circuit 12 generates a plurality of outputs including a primary output, $V_{out1}$, which may represent, for example, a low voltage output generated on signal line 14 which is applied to load Circuit 12 also generates a plurality of outputs on signal lines 16, representing, for example, high voltage outputs, $V_{out2}$–$V_{outN}$, applied to load 2 through load N. Capacitors 18 and 20 connect the output voltage lines to ground to stabilize the respective output voltages of DC—DC converter circuit 12.

DC—DC converter circuit 12 may comprise, for example, the converter which is described and illustrated in U.S. Pat. No. 5,541,828, the description and drawings of which are incorporated here in by reference. Circuit 12 includes a feedback control circuit including, for example, feedback control and a pulse width modulator which senses the output voltage at $V_{out1}$ along signal line 22. The $V_{out1}$ output voltage is compared to a reference voltage to generate an error voltage signal which is applied to a pulse width modulator to control the drive signal applied to switches within circuit 12 which control operation of a power transformer within circuit 12. $V_{out1}$ is therefore regulated by the feedback loop from the output on signal line 22 to circuit 12.

In accordance with the present invention, an adjustable impedance source 30 is connected at the output of signal line 14 within the low voltage output of DC—DC converter circuit 12. Adjustable impedance source 30 is controlled by a sensing circuit 32 which generates an output on signal line 34. The input to sensing circuit 32 is the secondary outputs $V_{out2}$–$V_{outN}$, along signal lines 36. Changes in the output voltages $V_{out2}$–$V_{outN}$, are detected by sensing circuit 32 to modulate adjustable impedance source 30 which in turn adjusts $V_{out1}$ which is applied in the feedback loop 22 to thereby control operation of the DC—DC converter circuit 12. In operation, for example, if a load2–loadN on a secondary output 16 of converter circuit 12 increases, the voltage on a corresponding output line 16 will drop. As that voltage drops, sensing circuit 32 will detect such a drop and will cause an increase in the impedance of impedance source 30 in the main output line 14 of converter circuit 12. Increase in impedance of source 30 will result in a drop in the main output voltage, sensed by the control circuit and pulse width modulator of circuit 12 resulting in an increase in the power output of DC—DC converter 12. As this power goes up, this increase will cause the voltages on secondary output lines 16 to increase. As a result, regulation has been achieved on secondary output lines 16 through impedance modulation of primary output line 14. This cross regulation has been achieved with low power dissipation through component selection for adjustable impedance source 30 as will subsequently be described.

Figure 2:
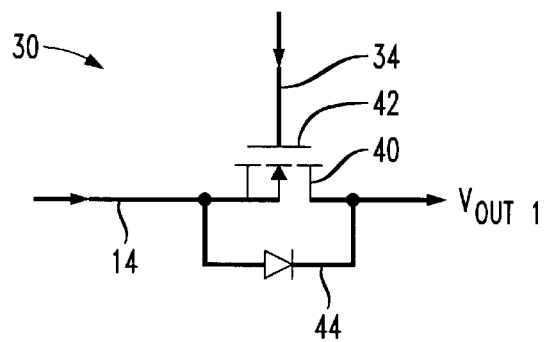
FIG. 2 is a schematic diagram of an embodiment of an adjustable impedance source shown in FIG. 1.

FIG. 2 illustrates an embodiment of adjustable impedance source 30 which comprises a MOSFET 40 whose gate 42 receives the output of sensing circuit 32 via signal line 34. MOSFET 40 includes a body diode 44. Body diode 44 serves to clamp the maximum voltage across MOSFET 40 thereby limiting the power dissipation in MOSFET 40 during overload conditions. Body diode 44 thereby limits the adjustability range of outputs 16 by clamping the maximum voltage drop that can be accommodated in output line 14. MOSFET 40 is power limited by the desired voltage drop times the maximum output current of DC—DC converter circuit 12 in output 14.

Figure 3:
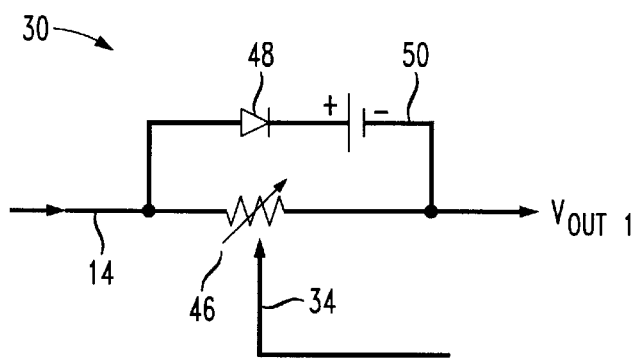
FIG. 3 is a schematic diagram of an additional embodiment of an adjustable impedance source shown in FIG. 1.

FIG. 3 illustrates an additional embodiment of adjustable impedance source 30 comprising a variable resistor 46 in parallel with a diode 48 and voltage supply 50. Diode 48 functions as a clamp in a manner similar to body diode 44 of MOSFET 40.

Figure 4:
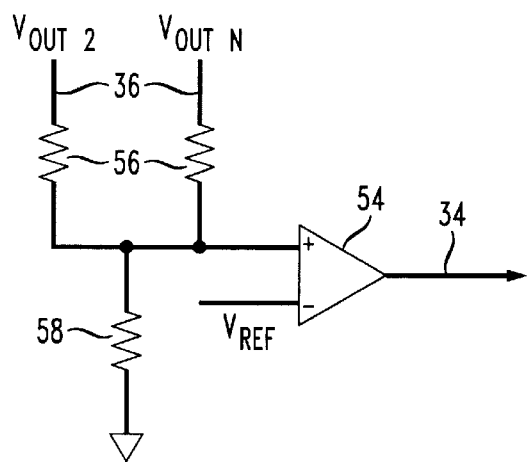
FIG. 4 is a schematic diagram of a sensing circuit shown in FIG. 1.

FIG. 4 illustrates an embodiment of sensing circuit 32 comprising an amplifier 54 which sums the voltages of output lines $V_{out2}$-$V_{outN}$ via signal lines 36 through resistors 56 on each signal line 36 and a resistor 58. The summed voltages are compared to a reference to generate an output signal on signal line 34 representing changes in the outputs of $V_{out2}$-$V_{outN}$.

It therefore can be seen that the present compensation circuit provides for the regulation of multiple outputs of a DC—DC converter by controlling an impedance source within a primary output of the converter. Such regulation may result by controlling the gate of a MOSFET in the primary output of the converter. Through use of the body diode of the MOSFET, the body diode clamps the maximum voltage across the MOSFET, such that power dissipation in the MOSFET is limited during overload conditions.

Whereas the present invention has been described with respect to specific embodiments thereof, it will be understood that various changes and modifications will be suggested to one skilled in the art and it is intended to encompass such changes and modifications as fall within the scope of the appended claims.

What is claimed is:

1. A compensation circuit for a DC—DC converter having a plurality of output lines for generating a plurality of output voltages applied to a plurality of loads, the circuit comprising:
   an adjustable impedance source connected to one of the plurality of output lines which generates a feedback control signal to the DC—DC converter; and
   a sensing circuit connected to the other ones of the plurality of output lines for generating a control signal representing variations in the output voltages of the DC—DC converter, said control signal being applied to said adjustable impedance source to thereby regulate said feedback control signal.

2. The compensation circuit of claim 1 wherein said adjustable impedance source includes a MOSFET having a gate, said gate connected to receive said control signal.

3. The compensation circuit of claim 1 wherein said adjustable impedance source includes a variable resistor connected in parallel with a diode and voltage source, said variable resistor being connected to receive said control signal.

4. The compensation circuit of claim 1 wherein said sensing circuit includes a voltage summing circuit.

5. The compensation circuit of claim 4 wherein said voltage summing circuit includes an operation amplifier.

6. A compensation circuit for a DC—DC converter having a low voltage output line and a plurality of high voltage output lines applied to a plurality of loads, the circuit comprising:
   an adjustable impedance source connected to the low voltage output line which generates a feedback control signal to the DC—DC converter; and
   a sensing circuit connected to the plurality of high voltage output lines for generating a control signal representing variations in the output voltages of the high voltage output lines, said control signal being applied to said adjustable impedance source to thereby regulate said feedback control signal.

7. The compensation circuit of claim 6 wherein said adjustable impedance source includes a MOSFET having a gate, said gate connected to receive said control signal.

8. The compensation circuit of claim 6 wherein said adjustable impedance source includes a variable resistor connected in parallel with a diode and voltage source, said variable resistor being connected to receive said control signal.

9. The compensation circuit of claim 6 wherein said sensing circuit includes a voltage summing circuit.

10. The compensation circuit of claim 9 wherein said voltage summing circuit includes an operation amplifier.

11. A method for compensating the outputs of a DC—DC converter having a low voltage output line and a plurality of high voltage output lines applied to a plurality of loads, the method comprising:
    sensing voltage changes in the outputs of the plurality of high voltage output lines of the converter and generating a control signal representing variations in the output voltages of the high voltage output lines;
    inserting an adjustable impedance in the low voltage output line; and
    adjusting the adjustable impedance in the low voltage output line based upon the control signal for controlling a feedback control signal applied to the DC—DC converter.

12. The method of claim 11 wherein the adjustable impedance source is adjusted by controlling a gate of a MOSFET.

13. The method of claim 11 wherein the adjustable impedance source is controlled by adjusting a variable resistor.

14. The method of claim 11 wherein the output voltages of the high voltage output lines are sensed using a voltage summing circuit.

15. A DC—DC compensation circuit comprising:
    a DC—DC converter having a plurality of output lines for generating a plurality of output voltages applied to a plurality of loads;
    adjustable impedance source connected to one of said plurality of output lines which generates a feedback control signal to said DC—DC converter; and
    a sensing circuit connected to the other ones of said plurality of output lines for generating a control signal representing variations in the output voltages of said DC—DC converter, said control signal being applied to said adjustable impedance source to thereby regulate said feedback control signal.

16. The compensation circuit of claim 15 wherein said adjustable impedance source includes a MOSFET having a gate, said gate connected to receive said control signal.

17. The compensation circuit of claim 15 wherein said adjustable impedance source includes a variable resistor connected in parallel with a diode and voltage source, said variable resistor being connected to receive said control signal.

18. The compensation circuit of claim 15 wherein said sensing circuit includes a voltage summing circuit.

19. The compensation circuit of claim 18 wherein said voltage summing circuit includes an operation amplifier.

* * * * *